Figure 1:
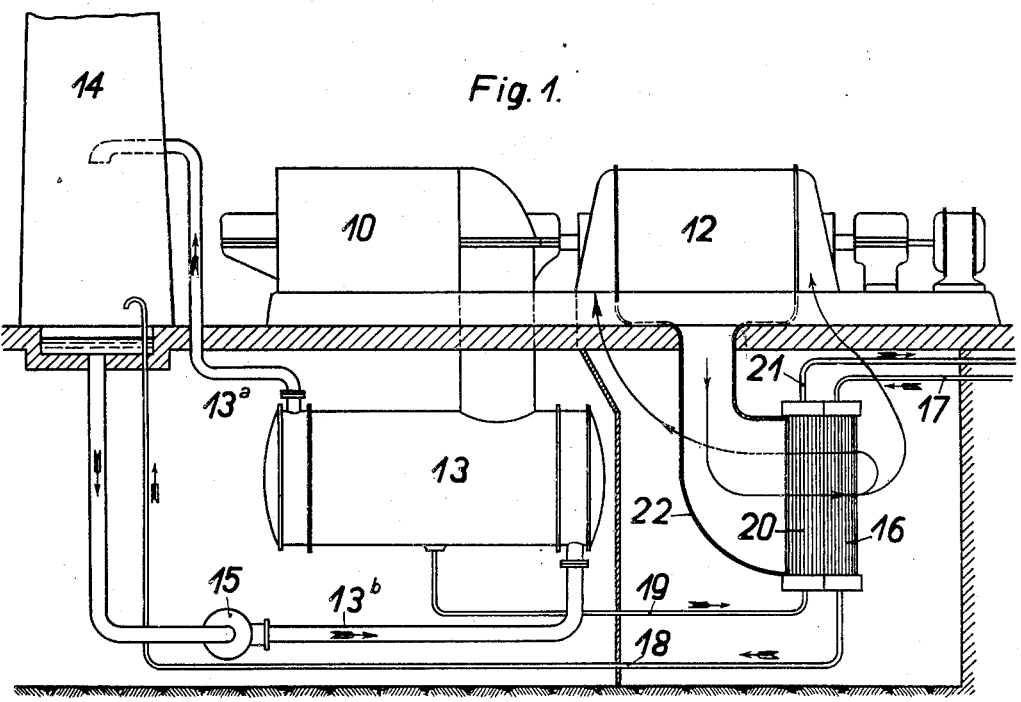

Dec. 31, 1929.  A. BAUMANN  1,741,605
POWER PLANT INSTALLATION
Filed May 3, 1926

Adolf Baumann
Inventor

Patented Dec. 31, 1929

1,741,605

UNITED STATES PATENT OFFICE

ADOLF BAUMANN, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

POWER-PLANT INSTALLATION

Application filed May 3, 1926, Serial No. 106,353, and in Germany May 4, 1925.

This invention relates to the mechanical organization of plants for the generation of electrical power or the like, from steam power supplied by boilers.

The general object of the invention is to provide apparatus which will be effective in the direction of efficient performance, through the conservation and utilization of heat produced incident to the operation of the apparatus and ordinarily regarded as representing a loss, and which will be effective in the direction of safety by virtue of the provision which it makes for the protection, through cooling, of portions of the apparatus subject to undesirable heating.

An ancillary object is the provision of a system whereby these advantages may be attained with minimum apparatus additional to the work performing installation.

Other and further objects will be pointed out or indicated hereinafter or obvious to one skilled in the art upon an understanding of the invention.

The accompanying drawing forming a part of this specification shows one form which the invention may take but it is to be understood that the claims are not limited to simply this form or arrangement of apparatus.

Figure 2:
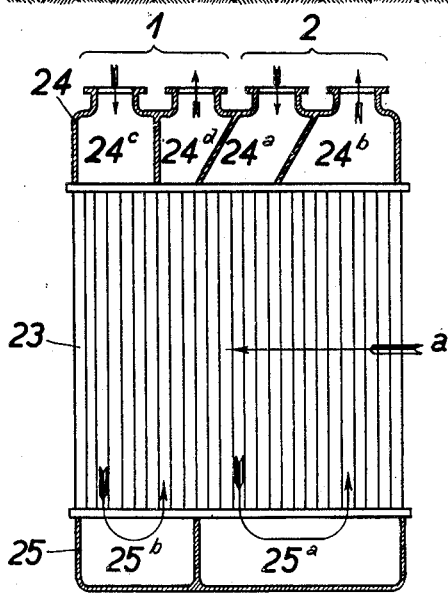
Figure 3:
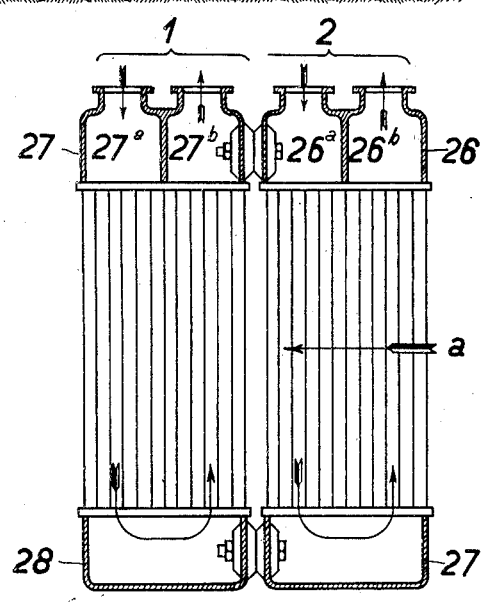

In the drawing,

Fig. 1 is a side elevational view of a turbo generator installation embodying the invention, and Figs. 2 and 3 are part sectional elevations of heat transfer elements.

As is well known, in the operation of electric generators, and other apparatus, a very substantial amount of heat is generated, which represents not only a loss of energy, but also constitutes a possible source of danger and imposes limitations on the operation and productive capacity of the apparatus. The present invention provides a system for the removal of this heat from the machine, thereby affording protection to the latter and advancing its limit of productivity, and affording productive utilization of the heat in the preheater of the boiler feed water. In the example of the customary turbo-generator installation shown in the drawing, let it be understood that numeral 10 designates a steam turbine, the exhaust of which is discharged to a condenser 13, the same being cooled by water circulated between the condenser and cooling tower 14, through the pipes $13^a$ and $13^b$ by a pump 15. The turbine 10 drives the generator 12, which is of the air ventilated type arranged so that incident to its operation air is circulated among its windings and magnetized portions and expelled from the casing to carry off the heat resulting from the usual electrical losses in the machine.

In accordance with the customary practice, the condensate produced in the condenser 13 is returned to the boiler as feed water for further generation of steam. A certain amount of evaporation of the condenser cooling water takes place in the cooling tower 14 and has to be made up by the addition of cooling water from an outside source.

The present invention contemplates the employment of both the condensate and the cooling tower make up water for the cooling of the ventilating air of the generator, said cooling taking place as an incident in the cycle of air circulation carried on in a closed system of which the generator casing is a part. In the accomplishment of this operation, I provide a suitable heat exchange element as exemplified by the elements 16 and 20 in the installation shown in the drawing. A conduit 22 leads from the air outlet of the generator casing to one side of the heat exchange element for the purpose of conducting the expelled air into contact with the heat exchange surfaces. After circulating through the element the air returns to the inlet portions of the generator casing. While comprising a unitary installation, the heat exchange element is divided into two sections for the circulation of the cooling water therethrough. The section designated 20 is supplied with the condensate from the condenser 13, which condensate, after taking up the heat from the air passing through the element, is discharged by way of pipe 21 to the boiler or the feed water heater. The section 16 is supplied with the cooling tower make up water through pipe 17, the same passing to the tower 14 through the pipe 18 after circulation through the cooling element. The disposal of the sections 16—20 is such that the heated air from the generator passes first through the section 20, supplied from the condenser. Thus the condensate is subjected to the influence of the air while the latter is at its highest temperature, so that the condensate is afforded an opportunity of extracting the greatest amount of heat possible for return to the boiler. If the air from the generator carries considerable heat, however, the condensate may not be able to cool it sufficiently for return to the generator, so the further cooling is accomplished by the cooling tower make up water incident to the passage of the air through section 16. In this fashion the air is reduced to a temperature which will render it more effective in the generator and permit operation of the latter to better advantage, a substantial proportion of the heat carried by the air from the generator being conserved in the boiler feed water.

In Figs. 2 and 3 are shown alternative constructions of the heat exchange element wherein the same comprises separate parts, one for the condensate from the condenser and the other for the cooling tower make up water. By reason of the constructions shown in these figures, the cooling tower make up water, which might be polluted in more or less degree, is kept separate from and is not mixed with the condensate which is returned to the boiler. In the form shown in Fig. 2 manifold headers 24 and 25 afford mountings for the circulating tubes 23. The header 24 has an inlet section 24ª and an outlet section 24ᵇ for the condensate, the tubes communicating with the respective sections at their upper ends, being in communication at their lower ends through the section 25ª of the lower header. The sections 24ᶜ and 24ᵈ are respectively inlet and outlet compartments for the cooling tower make up water, the circulating tubes leading therefrom having communication at their lower ends through the header compartment 25ᵇ. The air passes between the circulating tubes in the direction indicated by the arrow a. In the form shown in Fig. 3 the element is of sectional construction, the section for the condensate having a manifold header 26 with inlet compartment 26ª and outlet compartments 26ᵇ, and the connecting header 27 at the other end of the tubes. The make up water section has the manifold header 27 with inlet compartment 27ª and outlet compartment 27ᵇ, the tubes being connected at the other end through the header 28. The relative disposal of inlet and outlet compartments in all instances preferably is with the outlet compartment on the side towards the air supply so that circulation will be maintained through the element in accordance with the counter-current principle.

What I claim is:

1. The combination with a steam engine having a condenser and cooling tower, of a ventilating generator driven by the engine, and a heat exchange unit arranged to cool the ventilating air from the generator, said heat exchange unit having a part supplied with condensate from the condenser and a part separate from said first-named part and supplied with the cooling tower make up water, such parts being arranged in such wise that the part supplied with such condensate performs its cooling operation with respect to such air prior to performance of such operation by the part supplied with such make up water.

2. The combination with a steam engine having a condenser and cooling tower, of an electrical machine driven by the engine, a ventilating system for said machine, said ventilating system including a heat exchange element having a part supplied with condensate from the condenser and a part separate from said first-named part and supplied with the cooling tower make up water, said parts being arranged in such system in such wise that the part supplied with such condensate is effective before the part supplied with such make up water.

3. The combination with a steam engine having a condenser and cooling tower, of a machine driven by said engine, a ventilating system for said machine including a heat exchange element for cooling ventilating air from the machine, said heat exchange element having a part connected for circulation of water therethrough from the condenser to the boiler feed and a part separate from said first-named part and connected for circulation of water therethrough to the cooling tower, said parts being arranged in said system in such wise that the part supplied with the condenser water performs its cooling operation with respect to such air prior to performance of such operation by said second-named part.

4. The combination with a steam engine having a condenser and a cooling tower, of a machine driven by the engine, a cooling system for ventilating air from the machine, said cooling system including a heat exchange element having a portion connected for circulation of condensate from the condenser to the feed water heater and a portion separate from said first-named portions for circulation of cooling tower make up water therethrough, said portions being arranged in such system in such wise that the portion supplied with such condensate is effective before said second-named portion.

5. The combination with a steam engine having a condenser and cooling tower, of a generator driven by said engine, a heat exchange element having a part connected for passage of condensate from the condenser to the boiler feed and a part separate from said first-named part and connected for passage of make up water therethrough to the cooling tower, and means for directing ventilating air from the generator through the heat exchange element and back to the generator, said parts being arranged in such wise that the part supplied with such condensate is effective before said second-named part.

6. In a power plant, a steam engine, a condenser therefor, a cooling tower, connections providing for circulation of condensing water through said condenser and said tower, a generator driven by said engine, a closed air-ventilating system for said generator, a cooling element disposed in said system for cooling operation with respect thereto, connections between and providing for the flow of condensate from said condenser to said element, a second cooling element disposed in said system for conjoint cooling operation with said first-named element and being partitioned therefrom, and connections between and providing for the flow of make up water from said second element to said tower, said elements being arranged in series relation with respect to each other in said system with the first-named element first in such series in the direction of air-flow in said system.

In testimony whereof I have hereunto subscribed my name at Zurich, Switzerland, on the 16th day of March, A. D. 1926.

ADOLF BAUMANN.